(12) United States Patent
Zhang et al.

(10) Patent No.: US 9,522,358 B2
(45) Date of Patent: Dec. 20, 2016

(54) POROUS POLYMER MATERIAL

(75) Inventors: Yugen Zhang, Nanos (SG); Jackie Y. Ying, Nanos (SG); Mei Xuan Tan, Nanos (SG)

(73) Assignee: Agency for Science, Technology and Research, Singapore (SG)

( * ) Notice: Subject to any disclaimer, the term of this patent is extended or adjusted under 35 U.S.C. 154(b) by 386 days.

(21) Appl. No.: 13/825,678

(22) PCT Filed: Sep. 23, 2011

(86) PCT No.: PCT/SG2011/000328
§ 371 (c)(1),
(2), (4) Date: Mar. 22, 2013

(87) PCT Pub. No.: WO2012/039683
PCT Pub. Date: Mar. 29, 2012

(65) Prior Publication Data
US 2013/0189175 A1    Jul. 25, 2013

(51) Int. Cl.
*B01D 53/14* (2006.01)
*B01D 53/02* (2006.01)
(Continued)

(52) U.S. Cl.
CPC ............... *B01D 53/02* (2013.01); *B01D 53/62* (2013.01); *B01J 20/262* (2013.01); *B01J 20/264* (2013.01); *B01J 20/28007* (2013.01); *B01J 20/2808* (2013.01); *B01J 20/28057* (2013.01); *B01J 20/28071* (2013.01); *B01J 20/28073* (2013.01); *B01J 20/28076* (2013.01); *B01J 20/28083* (2013.01); *B01J 20/3028* (2013.01); *B82Y 30/00* (2013.01); *B82Y 40/00* (2013.01); *C08G 12/32* (2013.01); *C08J 9/228* (2013.01); *C08L 61/28* (2013.01); *C08L 61/32* (2013.01); *B01D 2253/202* (2013.01); *B01D 2253/308* (2013.01);
(Continued)

(58) Field of Classification Search
None
See application file for complete search history.

(56) References Cited

U.S. PATENT DOCUMENTS 1,783,901 A    12/1930    Bottoms
2007/0258879 A1*    11/2007    Karles .................... A24D 3/163
423/445 R
(Continued)

FOREIGN PATENT DOCUMENTS

WO    WO-02/12380 A2    2/2002

OTHER PUBLICATIONS

Abu-Zahra, M., et al., "$CO_2$ capture from power plants Part II. A parametric study of the economical performance based on monoethanolamine". *International Journal of Greenhouse Gas Control, I.* (2007), 135-142.
(Continued)

*Primary Examiner* — Jennifer A. Smith
*Assistant Examiner* — Anita Nassiri Motlagh
(74) *Attorney, Agent, or Firm* — Schwegman Lundberg & Woessner, P.A.

(57) ABSTRACT

The present disclosure relates to a polymer material comprising mesopores extending between melamine-formaldehyde co-polymer nano-particles and wherein micropores extend within the co-polymer nano-particles, methods of producing the same and uses thereof.

16 Claims, 5 Drawing Sheets

Scheme 1

(51) Int. Cl.
  B01D 53/62      (2006.01)
  B82Y 30/00      (2011.01)
  B82Y 40/00      (2011.01)
  C08L 61/28      (2006.01)
  C08L 61/32      (2006.01)
  C08G 12/32      (2006.01)
  B01J 20/26      (2006.01)
  B01J 20/28      (2006.01)
  B01J 20/30      (2006.01)
  C08J 9/228      (2006.01)

(52) U.S. Cl.
  CPC ... B01D 2257/502 (2013.01); B01D 2257/504 (2013.01); C08J 2361/28 (2013.01); Y02C 10/04 (2013.01); Y02C 10/08 (2013.01); Y02P 20/152 (2015.11); Y10T 428/2982 (2015.01)

(56) References Cited

U.S. PATENT DOCUMENTS

| | | | |
|---|---|---|---|
| 2009/0260645 A1* | 10/2009 | Brotton | A24B 15/245 131/342 |
| 2010/0083697 A1 | 4/2010 | Degenstein | |
| 2010/0092370 A1 | 4/2010 | Zhang et al. | |
| 2010/0168285 A1 | 7/2010 | Kim | |

OTHER PUBLICATIONS

Caskey, S. R., et al., "Dramatic Tuning of Carbon Dioxide Uptake via Metal Substitution in a Coordination Polymer with Cylindrical Pores", *J. Am. Chem, Soc., 130*, (2008), 10870-10871.

Chen, C., et al., "Amine-impregnated silica monolith with a hierarchical pore structure: enhancement of $CO_2$ capture capacity ", *Chem. Commun.*, (2009), 3627-3629.

Choi, H.-S., et al., "Highly Selective $CO_2$ Capture in Flexible 3D Coordination Polymer Networks", *Angew. Chem. Int. Ed. 48*, (2009), 6865-6869.

Demessence, A., "Strong $CO_2$ Binding in a Water-Stable, Triazolate-Bridged Metal-Organic Framework Functionalized with Ethylenediamine", *J. Am. Chem. Soc., 131*, (2009), 8784-8786.

Derylo-Marczewska, A., et al., "Characterization of Melamine-Formaldehyde Resins by XPS, SAXS, and Sorption Techniques", *Langmuir, 18*, (2002), 7538-7543.

Drage, T. C., et al., "Preparation of carbon dioxide adsorbents from the chemical activation of urea—formaldehyde and melamine—formaldehyde resins", *Fuel, 86*, (2007), 22-31.

Egger, C. C., et al., "Design of highly porous melamine-based networks through a bicontinuous microemulsion ternplating strategy", *J. Sol-Gel Sci. Technol., 48*, (2008), 86-94.

Filburn, T., et al., "Development of Supported Ethanolamines for CO2 Capture", *Ind. Eng. Chem. Res, 44*, (2005), 1542-1546.

Furukawa, H., et al., "Storage of Hydrogen, Methane, and Carbon Dioxide in Highly Porous Covalent Organic Frameworks for Clean Energy Applications", *J. Am. Chem. Soc. 131*, (2009), 8875-3883.

Goettmann, F., et al., "Metal-Free Activation of $CO_2$ by Mesoporous Graphitic Carbon Nitride", *Angew. Chem. Int. Ed., 46*, (2007), 2717-2720.

Goetz, V., et al., "Carbon dioxide-methane mixture adsorption on activated carbon", *Adsorption, 12*, (2006), 55-63.

Goworek, J., et al., "Absorption/adsorption properties of porous phenolic-formaldehyde and melamine-formaldehyde polymers", *Materials Chemistry and Physics, 77*, (2002), 276-280.

Riduan, S. N., et al., "Conversion of Carbon Dioxide into Methanol with Silanes over N-Heterocyclic Carbene Catalysts", *Angew. Chem. Int. Ed., 48*, (2009), 3322-3325.

Rinker, E. B., et al., "Absorption of Carbon Dioxide into Aqueous Blends of Diethanolamine and Methyldiethanolamine", *Ind. Eng. Chem. Res., 39*, (2000), 4346-4356.

Rochelle, G. T., "Amine Scrubbing for $CO_2$ Capture", *Science, 325*, (2009), 1652-1654.

Rosi, N. L., et al., "Rod Packings and Metal-Organic Frameworks Constructed from Rod-Shaped Secondary Building Units", *J. Am. Chem. Soc., 127*, (2005), 1504-1518.

Schmidt, D. F., et al., "Colloidal Gelation as a General Approach to the Production of Porous Materials", *Chem. Mater., 20*, (2008), 2851-2853.

Schwab, M. G., et al., "Catalyst-free Preparation of Melamine-Based Microporous Polymer Networks through Schiff Base Chemistry", *J. Am. Chem. Soc., 131*, (2009), 7216-7217.

Xu, X., et al., "Novel Polyethylenimine-Modified Mesoporous Molecular Sieve of MCM-41 Type as High-Capacity Adsorbent for $CO_2$ Capture", *Energy & Fuels, 16*, (2002), 1463-1469.

Xu, X., et al., "Preparation and characterization of novel $CO_2$ "molecular basket" adsorbents based on polymer-modified mesoporous molecular sieve MCM-41", *Microporous and Mesoporous Materials, 62*, (2003), 29-45.

Yue, M. B., et al., "Efficient $CO_2$ Capturer Derived from As-Synthesized MCM-41 Modified with Amine", *Chem. Eur. J., 14(11)*, (2008), 3442-3451.

Zhang, Y., et al., "Microporous Polyisocyanurate and Its Application in Heterogeneous Catalysis", *Chem. Eur. J., 15*, (2009), 1077-1081.

Zhou, H., et al., "N-Heterocyclic Carbene Functionalized Polymer for Reversible Fixation-Release of CO2", *Macromolecules, 42*, (2009), 5419-5421.

"International Application No. PCT/SG2011/000328, International Search Report and Written Opinion mailed Dec. 20, 2011", 13 pgs.

Pevida, C., et al., "Silica-templated melamine—formaldehyde resin derived adsorbents for CO2 capture", Carbon, 46(11), (Sep. 2008), 1464-1474.

"Chinese Application Serial No. 201180046091.7, Argument and Amendment filed Dec. 16, 2014 to Office Action mailed Jul. 1, 2014", (w/ English Translation of Argument), 33 pgs.

"Chinese Application Serial No. 201180046091.7, Office Action mailed Apr. 20, 2015", (w/ English Translation), 17 pgs.

"Chinese Application Serial No. 201180046091.7, Office Action mailed Jul. 1, 2014", w/ English Translation), 18 pgs.

"Chinese Application Serial No. 201180046091.7, Office Action mailed Dec. 30, 2015", (w/ English Translation), 17 pgs.

"European Application Serial No. 11827066.9, Supplementary European Search Report mailed Oct. 14, 2015", 6 pgs.

"International Application No. PCT/SG2011/000328, International Preliminary Report on Patentability mailed Apr. 4, 2013", 9 pgs.

Ren, Baozeng, "Determination and Correlation of Melamine Solubility", (w/ English Translation), *Journal of Chemical Industry and Engineering, 54(7)*, (Jul. 2003), 1001-1003.

\* cited by examiner

Scheme 1

POROUS POLYMER MATERIAL

PRIORITY CLAIM TO RELATED APPLICATIONS

This application is a national stage application under 35 U.S.C. §371 of PCT/SG2011/000328, filed Sep. 23, 2011, and published as WO 2012/039683 A1 on Mar. 29, 2012, which claims priority to Singapore Application No. 201007003-5, filed Sep. 24, 2010, which applications and publication are incorporated by reference as if reproduced herein and made a part hereof in their entirety, and the benefit of priority of each of which is claimed herein.

TECHNICAL FIELD

The present invention generally relates to a polymer material that can be used as an adsorbent for the adsorption of gas such as carbon dioxide. The present invention also relates to a method of making the porous polymer material.

BACKGROUND

Fossil fuels represent the main source of energy for the past century and this situation is likely to continue in the coming decades. The demand for fossil fuels today exceeds 5000 gigatons of carbon per year and creates major concerns for nature's carbon balance and which instigate or impact on global climate change. While it is important to develop "carbon-neutral" energy to cope with total energy consumption, advancement in technologies related to carbon capture and sequestration (CCS) are equally important in addressing the issue of global climate change.

The process of "amine scrubbing" is one of the most cost effective methods currently available to remove carbon dioxide from flue gasses such as those emitted by coal fired power stations. In amine scrubbing, an aqueous solution of alkanolamine, such as a 30 wt % monoethanolamine (MEA), is used to absorb carbon dioxide via chemisorptive formation of a carbamate, carbonate or bicarbonate species in the presence of water. Regeneration of the amine usually requires the application of elevated temperatures (100° C. to 150° C.) to cleave the covalent bonds between the amine group and the carbon dioxide to thereby release the gaseous carbon dioxide and regenerate the amine. The bonding energies of these covalent bonds are typically about 100 kJ/mol and hence the regeneration of the amine expends significant energy (also termed as the "energy penalty") in the process of absorbing carbon dioxide gas. Accordingly, the disadvantages of using liquid amine scrubbing include the corrosive and volatile nature of amine and the aforementioned high energy penalty. Furthermore, a liquid amine scrubber requires periodic top-up of the amine solvent due to loss of the liquid amine during the gas-scrubbing and regeneration process, e.g., evaporative losses, leakage, etc. This in turn translates to increased operating costs attributed to the need to periodically replenish the liquid amine.

Accordingly, solid sorbents have been proposed as alternatives to conventional liquid amine scrubbers. In this regard, certain solid sorbents have been found to be effective for carbon dioxide separation and capture. In particular, a number of porous systems have been investigated for carbon dioxide capture and numerous functionalized amines or nitrogen-rich solid materials have been reported to demonstrate enhanced carbon dioxide uptake property. Known solid sorbents include activated carbon, zeolites, amine-modified silicas, hybrid crystalline solids (such as Metal Organic Frameworks (MOP), Zeolitic Imidazole Frameworks (ZIP)) and porous polymers (such as Covalent Organic Frameworks (COF), Conjugated Microporous Polymers (CMP) and Hyper Cross-linked Polymers (HCP)). Furthermore, solid sorbents comprising melamine functionality obtained by immobilization of melamine on the surface of porous silica or incorporation of melamine into a COF structure have also been proposed in the art. However, these mesoporous solid sorbents typically require complex synthesis procedures and involve high production costs, thereby limiting their applications in large scale industrial use.

Poly-melamine formaldehyde (PMF) is a known co-polymer material that has been widely used as in plastic laminate and overlay materials, thermal insulators, sensors and lenses. Additionally, porous PMF has been considered for use in the absorption of compounds such as benzene and water. However, known PMF resins and foams produced by conventional methods, e.g., use of soft templates or by sol-gel processes, typically possess surface areas of less than 100 $m^2/g$. While PMF synthesis using colloidal silica templates have managed to exhibit higher surface areas of 220 $m^2/g$, the total surface area is still insufficient for performing effective gas adsorption. As a result, these porous PMF materials remain unsatisfactory for fabricating materials for adsorbing gases such as carbon dioxide. Furthermore, synthesis methods involving the use of colloidal silica templates are also considerably more complex and lack scale-up potential.

One study disclosed a porous melamine-based polymer formed from a reaction between melamine and aryl-aldehydes. This porous melamine-based polymer is reported to exhibit high surface areas of about 1,000 $m^2/g$. In one embodiment, this porous melamine-based polymer is formed from a reaction between melamine and a combination of di- and tri-phenyl-aldehydes. One drawback of this melamine-aldehyde polymer is that, due to the presence of the large aryl groups in the polymer structure, large and irregular interstitial spaces may occur within the polymer structure that are thought to increase the pore size and reducing the total surface area. Furthermore, the presence of large aryl groups decreases the density of the amine functional groups available for reaction with gas molecules. This in turn may have an adverse effect on the effectiveness of the polymer if used for gas absorption. Another drawback of the above disclosed porous melamine-based polymer is the relatively high cost associated with procuring the aryl-aldehydes reactants.

In another known method of making a melamine-based polymer, it has been proposed to form a PMF polymer aerogel by reacting melamine with formaldehyde in the presence of a strong sodium hydroxide base catalyst in an aqueous medium. However, the synthesis method involves a multiple-step process, including at least one pH modifying step and a curing step. The sodium hydroxide base catalyst also needs to be neutralized by a pH modifier such as an acid. The sodium hydroxide catalyst in the aqueous medium results in hydroxide functionalization of the bridging groups between the melamine groups of the produced cross-linked PMF. The hydroxide functionalization renders the PMF unsuitable as a gas adsorbent for gases such as carbon dioxide. Furthermore, due to the multiple steps in the process and the need to neutralize the sodium hydroxide base, the process is not suitable or is at least inhibited from being used on an industrial scale to produce porous PMF.

Accordingly, there is a need to provide a novel solid sorbent material for use as a gas adsorber which overcomes, or at least ameliorates one of the disadvantages mentioned above. In particular, there is a need to provide an inexpensive solid sorbent for use as a gas adsorber that is durable, exhibits high surface area for adsorption, is relatively easy to synthesize and regenerate. There is further a need to provide a method for producing this solid sorbent.

SUMMARY

In a first aspect, there is provided a polymer material comprising mesopores extending between melamine-formaldehyde co-polymer nano-particles and wherein micropores extend within the co-polymer nano-particles.

The combination of the mesopores and micropores results in a very melamine-formaldehyde co-polymer with a very high surface area. The disclosed polymer material exhibits a high surface area, a well-defined pore structure and a high density of amine functional groups. Advantageously, owing to its high surface area, the disclosed polymer has been found to exhibit a high rate of $CO_2$ adsorption and desorption. Furthermore, the amine functional groups of the melamine units can form weakly-binding bonds with $CO_2$ molecules (having low bond energies between 15-26 kJ/mol). Advantageously, the disclosed polymer material can be regenerated easily as the adsorbed $CO_2$ gas can be readily desorbed and then purged from the polymer material, for example, by flushing with an inert gas. Furthermore, the disclosed polymer material is composed of readily available and inexpensive raw materials, i.e., melamine and formaldehyde. Therefore, the disclosed polymer material is cost-effective to produce and can be used as a $CO_2$ gas absorption agent and to provide an alternative to existing liquid $CO_2$ scrubbers. At the same time, the disclosed polymer material overcomes the technical drawbacks of existing solid sorbents which exhibit low surface areas for adsorption and which require complex synthesis procedures.

In one embodiment, the polymer material may comprise a surface area of at least 300 $m^2/g$. In another embodiment, the polymer material may possess a surface area of at least 600 $m^2/g$. In yet another embodiment, the polymer material may possess a surface area in a range of from 600 $m^2/g$ to 1,200 $m^2/g$. Advantageously, the large surface area is provided by the combination of the mesopores which extend between an agglomerated mass of melamine-formaldehyde co-polymer nano-particles and the micropores which extend within the melamine-formaldehyde co-polymer nano-particles themselves. The large surface area allows the polymer material to adsorb larger quantities of gaseous compounds relative to known polymer materials of melamine-formaldehyde co-polymer nano-particles and further improves the rate and extent of gas absorption. For example, the disclosed polymer material may be used as an adsorbent material in the fabrication of a solid gas scrubber for processing high throughput waste gases containing high concentrations of carbon dioxide.

In a second aspect, there is provided a sorbent material for adsorbing gas comprising the polymer material as described above.

In a third aspect, there is provided a sorbent material for adsorbing gas comprising an agglomeration of melamine-formaldehyde co-polymer nano-particles with mesopores extending between said nano-particles and wherein micropores extend within the nano-particles. Advantageously, the formation of micropores vastly increases the available surface area for the sorbent material to contact and adsorb the gas onto the surface of the polymer material. Further advantageously, the mesopores caused by the agglomeration of melamine-formaldehyde copolymer nano-particles increase the overall porosity of the polymer material, thereby allowing gases to freely flow through the polymer material with minimal or negligible pressure drop across the polymer material.

In a fourth aspect, there is provided the use of the polymer material as claimed in the first aspect to adsorb a gas. In one embodiment, the gas may be carbon dioxide. In another embodiment, the gas may be carbon monoxide.

In a fifth aspect, there is provided a method of removing at least one of carbon dioxide gas and carbon monoxide gas from a gas stream containing said at least one of carbon dioxide gas and carbon monoxide gas, the method comprising the step of contacting the gas stream with a polymer material as defined in the first aspect above to adsorb at least one of said carbon dioxide gas and carbon monoxide gas thereon.

In a sixth aspect, there is provided a method of making a polymer material comprising the step of reacting melamine with formaldehyde in the presence of a non-aqueous polar solvent.

Advantageously, the non-aqueous polar solvent is selected so that the reactant mixture of melamine and formaldehyde are soluble therein. As the melamine and formaldehyde react they form the resulting copolymer (hereafter "PMF polymer") is insoluble or has very poor insolubility in the selected non-aqueous solvent and hence copolymer nanoparticles form that have micropores extending therein. The microporous copolymer nanoparticles then agglomerate and adhere together to form mesopores therebetween. The selection of a non-aqueous solvent renders the resulting PMF polymer significantly more porous and having a higher surface area due to its high porosity relative to PMF that is reacted in a pure aqueous solvent such as water. However, it should be realized that while the disclosed method reacts melamine and formaldehyde in the presence of a non-aqueous solvent, an aqueous solvent such as water may also be present in the reactants.

Advantageously, the disclosed method is directed towards a simple, one-step synthesis of PMF polymer, which is easy to implement and can be potentially scaled up for industrial applications. Further advantageously, the disclosed method is capable of achieving a porous PMF polymer having the advantages of the polymer material described above, including a high surface area of from 300 $m^2/g$ to about 1,200 $m^2/g$, a defined pore structure, high capacity for gas adsorption and ease of regeneration.

DEFINITIONS

The following words and terms used herein shall have the meaning indicated:

The term "surface area" as used in the context of the present specification is taken to refer to the surface area as determined by the Brunauer Emmett Teller (BET) method ("$S_{BET}$"), which is the standard measurement of particulate surface area by gas porosimetry techniques and as will be well known to persons skilled in the art. The gas used in the BET analysis is typically nitrogen.

The term "mesopore" and grammatical variations thereof, as used in the context of the present specification is taken to refer to pores residing within a polymer material having a pore diameter, as measured via the BJH method, of between 2 nm to 50 nm.

The term "micropore" and grammatical variations thereof as used in the context of the present specification is taken to refer to pores residing within a polymer material having a pore diameter, as measured via the BJH method, of 2 nm or less.

The term "nanoparticle" and grammatical variations thereof, as used in the context of the present specification, refers to a macromolecular structure formed from a plurality of repeating monomer units, in the nanometer range of less than 1 micron.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

DISCLOSURE OF OPTIONAL EMBODIMENTS

Exemplary, non-limiting embodiments of a polymer material according to the first aspect will now be disclosed.

The polymer material may possess a surface area of at least 300 m$^2$/g. Preferably, the surface area of the polymer material is at least 600 m$^2$/g. Even more preferably, the surface area of the polymer material is in the range of 600 m$^2$/g to 1200 m$^2$/g. In one embodiment, the polymer material may possess a surface area of 400 m$^2$/g or more, 450 m$^2$/g or more, of 500 m$^2$/g or more, 550 m$^2$/g or more, of 600 m$^2$/g or more, 650 m$^2$/g or more, of 700 m$^2$/g or more, 750 m$^2$/g or more, 800 m$^2$/g or more, 850 m$^2$/g or mote, 900 m$^2$/g or more, 950 m$^2$/g or more, 1,000 m$^2$/g or more, 1050 m$^2$/g or more, and 1,100 m$^2$/g or more.

The melamine-formaldehyde co-polymer may be composed of repeating units of a monomer having a ring structure (hereafter "ring monomer"). Each ring monomer unit may comprise at least three melamine monomer units, each melamine monomer unit being linked to the other two melamine monomer units by way of a linking group. The ring monomer may form a closed ring configuration having a substantially triangular orientation which may be further extended at each of the three terminal apexes.

A plurality of amine functional groups may extend around the periphery of each ring monomer. In particular, the amine groups may be disposed at the apexes of the ring monomer unit and adjacent to the linkages between one melamine monomer unit and another melamine monomer unit.

The amine functional group may be a secondary amine (NHX$_2$) or a tertiary amine (NX$_3$), where X may be selected from a melamine group, substituted or unsubstituted C$_{1-4}$ alkyl or alkenyl, or halogen. In one embodiment, the amine functional group is a secondary amine. Preferably, the secondary amine is NHYX, where X is a melamine group and Y is a linker between two amine functional groups, such as, a C$_{1-4}$ alkyl group. In another embodiment, Y can be a terminal alcohol group, such as a C$_{1-4}$ alcohol. In another embodiment, Y is a methanol group (—CH$_2$OH).

Advantageously, the ring monomer is regularly shaped and is capable of forming an extensive, tessellated, cross-linked lattice structure comprising repeating units of the ring monomers. During the formation of the PMF, the interstitial spaces present between one ring monomer unit and its adjacent ring monomers promote the formation of the micropores within the PMF structure, which are less than 2 nm in pore diameter. In one embodiment, the micropores may be less than 1 nm in pore size.

The cross-linked lattice structure comprising the melamine-formaldehyde co-polymer may form nanoparticles, which may aggregate to form a mesoporous network within the polymer material. In this regard, voids formed between adjacent clusters of these nanoparticles may form mesopores residing within the mesoporous polymer material.

Advantageously, the absence of large pendulum substituent groups attached to either the melamine units or the linking group minimizes steric hindrance and bond strain in the polymer material. Accordingly, this results in a stable polymer structure comprising a high density of amine functional groups available for physisorption with gas molecules passing through the micropores of the polymer material.

The linking group may be an alkyl bridge extending between a pair of melamine groups, wherein the alkyl bridge comprises a lower alkyl group such as having 1 to 4, preferably 1 to 2 carbon atoms. It is preferred for the alkyl bridge to be a lower alkyl group to improve the rigidity of the ring monomer and to minimize steric hindrance caused by the linking group. In one embodiment, the alkyl bridge is methyl.

The total pore volume of the polymer material may include the total volume of the mesopores and the total volume of the micropores. In one embodiment, the total pore volume of the polymer material is in a range of 0.6 cm$^3$/g to 3.5 cm$^3$/g. In another embodiment, the total pore volume of the polymer material is in a range of 0.6 cm$^3$/g to 1.5 cm$^3$/g. In yet another embodiment, the total pore volume is in a range of 1.0 cm$^3$/g to 3.5 cm$^3$/g. In still another embodiment, the total pore volume is in a range of 1.14 cm$^3$/g to 3.46 cm$^3$/g.

The micropore volume may constitute 2% to 40% of the total pore volume or 5% to 30% of the total pore volume. In one embodiment, the micropore volume may be from about 6% to about 26% of the total pore volume. In another embodiment, the micropore volume may be from about 2% to about 7% of the total pore volume. In particular, the micropore volume may be in a range from 0.06 cm$^3$/g to 0.21 cm$^3$/g. In one embodiment, the micropore volume may be in a range of from 0.09 cm$^3$/g to 0.17 cm$^3$/g. In yet another embodiment, the micropore volume may be in a range from 0.06 cm$^3$/g to 0.14 cm$^3$/g. It has been found that the micropore volume correlates strongly with the adsorption capacity of the polymer material. Without wishing to be bound by theory, it has been postulated that the micropores are effective for $CO_2$ adsorption due to the intermolecular interactions between the triazine nitrogen atom and the carbon atom of the $CO_2$ molecules, and hydrogen bonding between H atoms of the peripheral amine functional groups and oxygen (O) atoms of the $CO_2$ molecule. Furthermore, as these intermolecular interactions are only weakly binding, it is easy to desorb the $CO_2$ molecules and regenerate the polymer material.

Using the well-known Barrett-Joyner-Halenda (BJH) method, the pore sizes of the polymer material may be analyzed. The mesopores may have pore sizes in a range of 5 nm to 50 nm, from 5 nm to 45 nm, from 5 nm to 40 nm, from 5 nm to 35 nm, from 5 nm to 30 nm, from 5 nm to 25 nm, from 5 nm to 20 nm, from 5 nm to 15 nm, and from 5 nm to 10 nm. In one embodiment, the mesopores may have pore sizes in a range of 5 nm to 50 nm. In yet, another embodiment, the mesopores may have pore sizes in the range of 5 nm to 20 nm. The pore sizes of the micropores may be 2 nm or lesser. In one embodiment, the micropores may be 1 nm or lesser.

Exemplary, non-limiting embodiments of a sorbent material according to the second and third aspects will now be disclosed.

The sorbent material may comprise the polymer material as disclosed above. In one embodiment, the sorbent material may comprise an agglomeration of melamine-formaldehyde co-polymer nano-particles with mesopores extending between said nano-particles and wherein micropores extend within the nano-particles. Advantageously, the sorbent material may be used for adsorbing one or more different types of gases. In one embodiment, the sorbent material is capable of adsorbing carbon dioxide. In another embodiment, the sorbent material is capable of adsorbing carbon monoxide.

The sorbent material may be capable of adsorbing at least 10 wt % carbon dioxide based on the total weight of the sorbent material, measured at 1 atmospheric pressure and 0° C. In one embodiment, the sorbent material may have a $CO_2$ adsorption capacity of from about 5 wt % to about 20 wt %. In one embodiment, the $CO_2$ adsorption capacity may be in a range from about at least 10 wt % to 20 wt %. In still another embodiment, the $CO_2$ adsorption capacity may be in a range from at least 14 wt % to 20 wt %. The $CO_2$ adsorption capacity may be measured as the change in weight as a percentage of the total weight of the sorbent material after the sorbent material has been saturated with $CO_2$.

Exemplary, non-limiting embodiments of the method according to the sixth aspect will now be disclosed.

The formaldehyde used in the disclosed method may be polymerized formaldehyde that has undergone condensation polymerization. The polymerized formaldehyde may comprise from about 8 to 100 carbon atoms. In one embodiment, the aldehyde is paraformaldehyde.

In the disclosed method, non-aqueous polar solvent may be an aprotic solvent, i.e., a solvent that does not contain a dissociable proton ($H^+$ ion). Advantageously, the aprotic solvent is a pH neutral solvent. Hence, the disclosed method does not require additional pH modifying steps. The aprotic solvent may also be selected from the general class of sulfones or sulfoxides. In one embodiment, the aprotic solvent is selected from an aliphatic sulfoxide, having a general formula of $R^1$—SO—$R^2$, wherein $R^1$ and $R^2$ may be same or different, and are independently selected from, substituted or unsubstituted $C_{1-9}$ alkyl and $C_{1-9}$ alkylene. In one embodiment, the aliphatic sulfoxide may comprise 2 to 10 carbon atoms. In another embodiment, the aliphatic sulfoxide may comprise 2 to 6 carbon atoms. In one embodiment, the aliphatic sulfoxide is dimethyl sulfoxide ($H_3C$—SO—$CH_3$).

Exemplary aprotic solvents may include, but are not limited to, dimethyl sulfoxide (DMSO), di-n-butyl sulfoxide, tetramethylene sulfoxide, methyl phenyl sulfoxide, and the like, as well as combinations of any two or more thereof. In one embodiment of, the sulfoxide solvent is DMSO.

0The reaction step may be undertaken at a temperature from 120° C. to 200° C., preferably from 120° C. to 170° C. In one embodiment, the reaction step may be undertaken at a temperature of 140° C.

During the reaction step, the non-aqueous polar solvent may be provided in admixture with an aqueous medium to form a co-solvent. In one embodiment, the aqueous medium is water. The non-aqueous polar solvent may be provided in admixture with water at a volume ratio of from a range selected from the group 1:1 to 3:1, 1.5:1 to 3:1, 2:1 to 3:1, 2.5:1 to 3:1, 1:1 to 2.5:1, 1.5:1 to 2.5:1, 2:1 to 2.5:1, 1:1 to 2:1, 1.5:1 to 2:1, and 1:1 to 1.5:1. In a preferred embodiment, the volume ration of polar solvent to water is 3:1. Advantageously, it has been found that by adding water to the solvent mixture, the reaction temperature may be lowered to about 140° C. Also advantageously, the use of the polar solvent-water admixture in the reaction step yielded a mesoporous polymer material having comparable performance to the mesoporous polymer material produced with pure DMSO as solvent. For example, in one embodiment, adding 25 vol % water to the polar solvent (i.e, a $DMSO/H_2O$ volume ratio of 3:1) during the reaction yielded mesoporous polymer having a surface area of 996 $m^2/g$ and a $CO_2$ adsorption capacity of about 15 wt %, which is comparable to the polymers produced with DMSO alone.

During the reaction step, the molar ratio of formaldehyde to melamine may be in a range from 1 to 5, from 1.65 to about 4.5, from 1.8 to 3.75, from 1.95 to 3.0, or from about 2.25 to 3.0. In one embodiment, the molar ratio of formaldehyde to melamine is in a range from 2.25 to 3.75. In another embodiment, the molar ration of formaldehyde to melamine is in a range from 1.5 to 2.5.

The reaction may be undertaken for a period of from 48 hours to 120 hours. In one embodiment, the reaction step is performed for 72 hours.

The reaction step may be performed in a closed system, for example, a bomb reactor or a pressure reactor. In one embodiment, the reactants are placed inside a steel bomb reactor and exposed to high temperatures in a heater, such as an oven. In another embodiment, the reaction step may also be carried out in a partially heated reactor. In one embodiment, the reactants are introduced into a small volume glass vial and placed over a heated metal plate.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIGS. 1 (*c*) and 1 (*d*) show TEM images of the melamine-formaldehyde co-polymer intermediates after undergoing five hours reaction.

FIG. 1(e) shows a TEM image of the melamine-formaldehyde co-polymer intermediate after undergoing ten hours reaction.

FIG. 1(f) shows a TEM image of the mesoporous structure of the synthesized melamine-formaldehyde co-polymer.

FIG. 1(g) shows a Scanning Electron Microscope (SEM) image of the synthesized melamine-formaldehyde co-polymer.

DETAILED DESCRIPTION OF DRAWINGS

Figure 1:
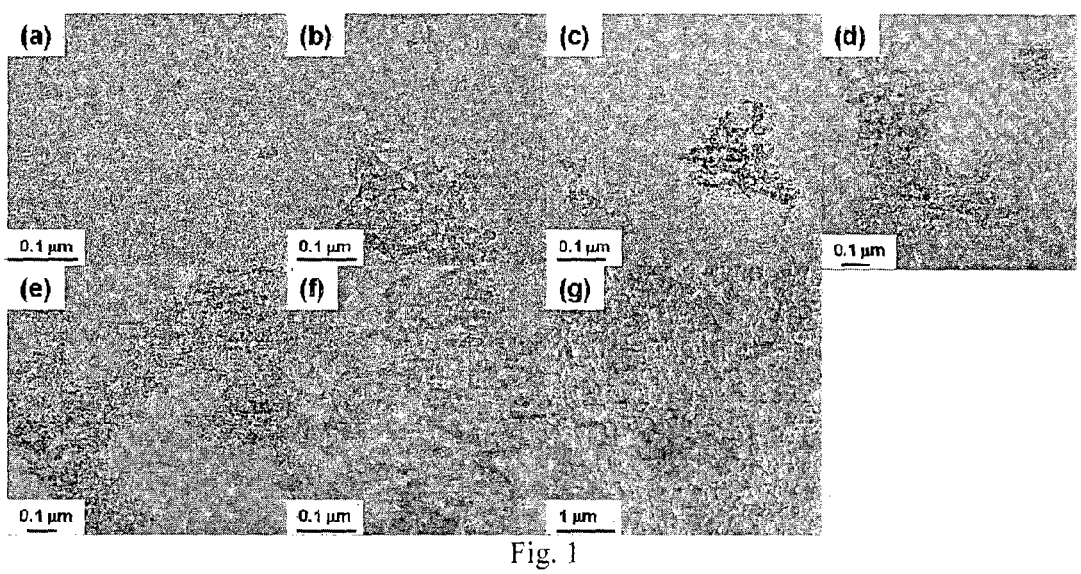
FIGS. 1 (*a*) and 1 (*b*) show Transmission Electron Microscope (TEM) images of melamine-formaldehyde co-polymer intermediates after undergoing one hour of reaction.

Referring to FIG. 1(a), there are shown, nano-particle flakes in the region of 10-50 nm formed by precipitating melamine-formaldehyde co-polymers. The initial melamine-formaldehyde monomer units are stabilized by the hydrogen bonding between the amine hydrogens with the solvent. Once nano-particle flakes with the size in the region of 10-50 nm are formed, the poor solubility of the melamine-formaldehyde co-polymers in the DMSO solvent induces precipitation. The flakes precipitate from the solvent as melamine-formaldehyde nano-particles comprising micropores within the structure of the nanoparticle flakes. In FIG. 1(b), there are shown, micro sized particles formed by agglomeration of nano-particle flakes. This agglomeration connects the nano-particle flakes, forming mesopores within the network of connecting nano-particles. FIGS. 1(c) to 1(g) show the step by step agglomerating the nanoparticle flakes to form a meso-porous melamine-formaldehyde co-polymer.

Figure 2:
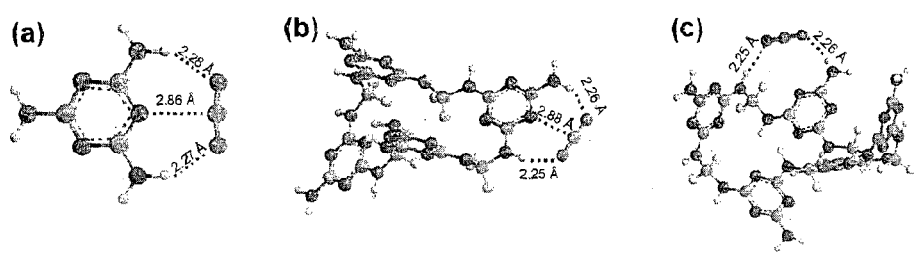
FIG. 2(a) shows a binding model of a carbon dioxide gas molecule with a melamine molecule.
FIG. 2(b) shows a binding model (type-I) of a carbon dioxide gas molecule with a melamine-formaldehyde co-polymer.
FIG. 2(c) shows a binding model (type-II) of a carbon dioxide gas molecule with a melamine-formaldehyde co-polymer.

FIG. 2 shows carbon dioxide binding models, the density functional theory (DFT) calculations were carried out with the Gaussian 03 software. The exchange-correlation functional employed is known as Becke, three-parameter, Lee-Yang-Parr (B3LYP) which includes a fraction of Hartree-Fock exchange to reduce the self-interaction error. In the analysis, the 6-31/G(d,p) basis sets were used. After the structure of each compound was fully optimized, the total energy was obtained.

In FIG. 2(a) there is shown a carbon dioxide molecule binding to a melamine molecule. The melamine is shown to display electrostatic interactions between the carbon of carbon dioxide molecule and the triazine nitrogen atom (C—N, 2.86 Å). In addition, there are hydrogen bond interactions between the carbon dioxide molecule and hydrogen atoms of the amine functional groups (H—O: 2.27 and 2.28 Å). The calculated total energy difference for this binding is −25.7 kJ/mol. The possible electrostatic interactions and slightly exothermic hydrogen bond interactions indicate a favorable physisorption model for binding of a carbon dioxide molecule to a melamine molecule. The low exothermic bond energy of the hydrogen bonds, further indicate that the binding model would be easily reversed.

In FIG. 2(b) there is shown a type-I binding of carbon dioxide molecule to melamine-formaldehyde co-polymer. The calculated energy difference for this binding model is around −25.3 to −26.5 kJ/mol. This is similar to FIG. 2(a). Hence, melamine-formaldehyde co-polymer should also bind reversibly to carbon dioxide.

In FIG. 2(c) there is shown a type-II binding of carbon dioxide molecule to melamine-formaldehyde co-polymer. This binding model displays only strong hydrogen interaction between carbon dioxide molecule and the melamine-formaldehyde co-polymer. The energy difference of type-II binding is about −15.2 kJ/mol, which is still favorable.

This physisorptive model is in agreement with the BET carbon dioxide adsorption/desorption behavior. Further, this also displays the importance of the role of micropores and mesopores in carbon dioxide gas absorption. The greater the microporosity of the melamine-formaldehyde co-polymer, the larger the capacity of the melamine-formaldehyde co-polymer is for gas adsorption. Of course, the example uses carbon dioxide gas as a model, however this would be applicable for other gases with similar molecular properties and interactions.

Figure 4:
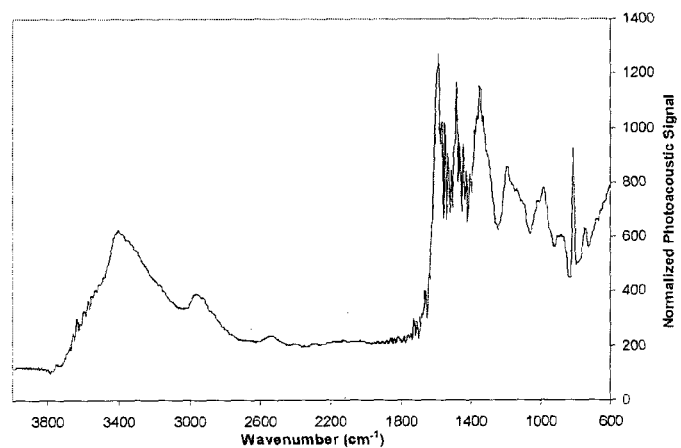
FIG. 4 shows the Photo-Acoustic Fourier Transform Infrared Spectroscopy (PA-FTIR) spectrum of the synthesized melamine-formaldehyde co-polymer.
Figure 5:
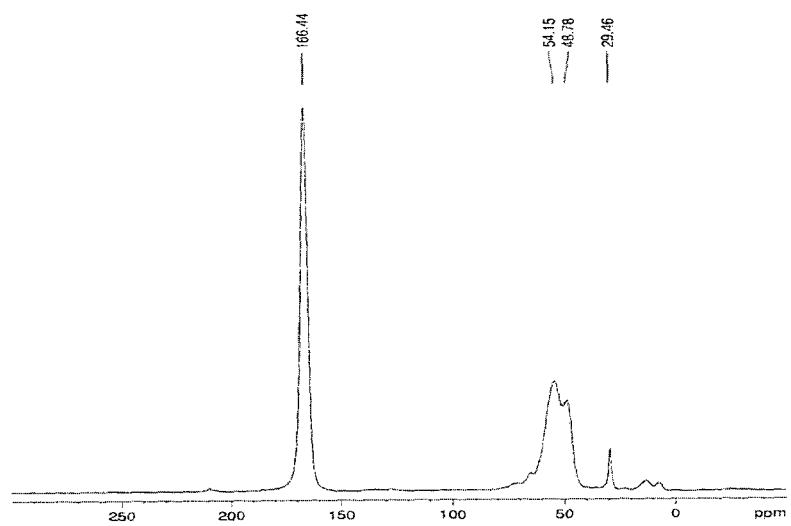
FIG. 5 shows the $^{13}C$ NMR spectrum of the synthesized melamine-formaldehyde co-polymer showing peaks associated with triazine carbon at 166 ppm, and bridging $CH_2$ groups at 48-54 ppm. The signal at 29.46 is from DMSO.
Figure 6:
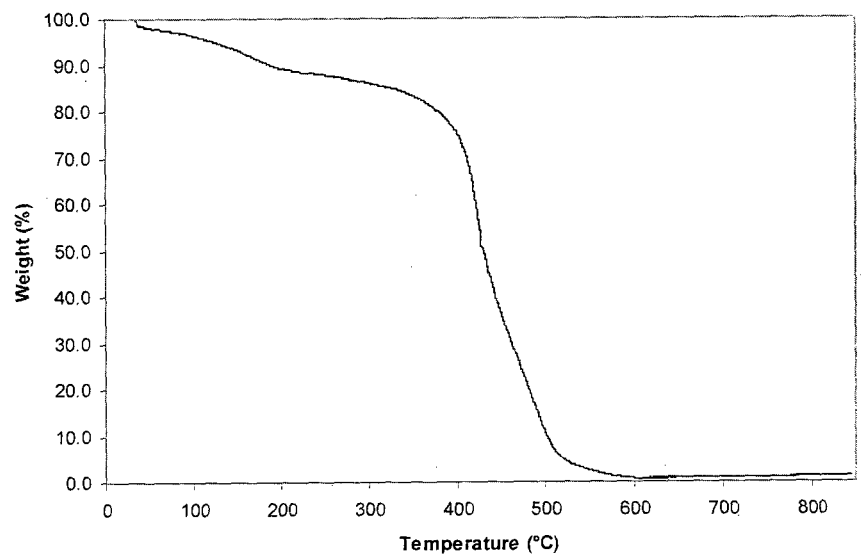
FIG. 6 shows the Thermogravimetric Analysis (TGA) profile of the synthesized melamine-formaldehyde co-polymer, showing thermal stability of up to about 400° C.
Figure 7:
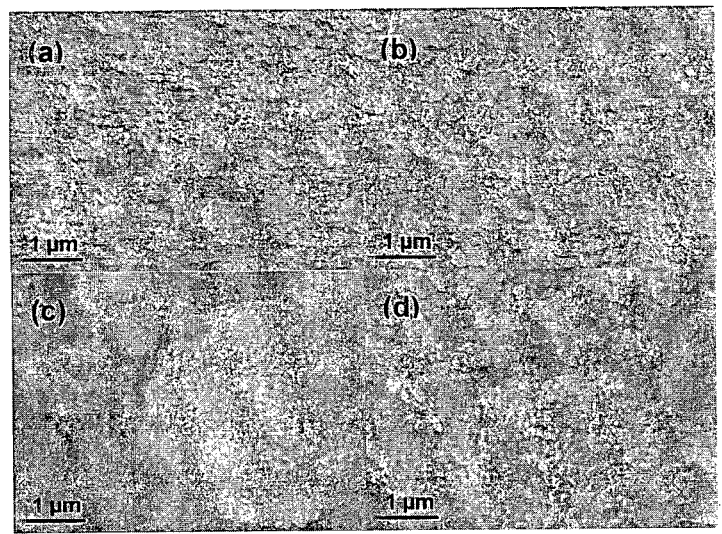
FIG. 7(a) shows a SEM image of the melamine-formaldehyde co-polymer synthesized by heating in an oven, using reaction conditions of 2.0M concentration and a paraformaldehyde to melamine ratio of 2.25:1.
FIG. 7(b) shows a SEM image of the melamine-formaldehyde co-polymer synthesized by heating in an oven, using reaction conditions of 2.0M concentration and a paraformaldehyde to melamine ratio of 3.75:1.
FIG. 7(c) shows a SEM image of the melamine-formaldehyde co-polymer synthesized by heating on a hotplate, using reaction conditions of 2.0M concentration and a paraformaldehyde to melamine ratio of 2.25:1.
FIG. 7(d) shows a SEM image of the melamine-formaldehyde co-polymer synthesized by heating on a hotplate, using reaction conditions of 2.0M concentration and a paraformaldehyde to melamine ratio of 3.75:1.
Figure 8:
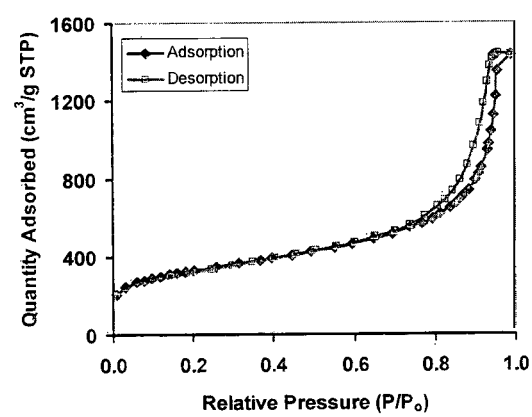
FIG. 8 shows the nitrogen gas adsorption/desorption isotherms of Example 2a at 77K.

FIG. 4 shows the Photo-Acoustic Fourier Transform Infrared Spectroscopy (PA-FTIR) spectrum of the synthesized melamine-formaldehyde co-polymer showing peaks associated with $NH_2$ or NH stretching at 3400 $cm^{-1}$, $CH_2$ stretching at 2950 $cm^{-1}$, imine stretching at 1600 $cm^{-1}$, and triazine stretching at 1550 $cm^{-1}$ and 1480 $cm^{-1}$. The first can be assigned to the carbon atoms present in the triazine ring and the double resonances at 48 and 54 ppm can be correlated to $CH_2$ groups that link two melamine molecules or a terminal —NH—$CH_2$—OH group.

Figure 10:
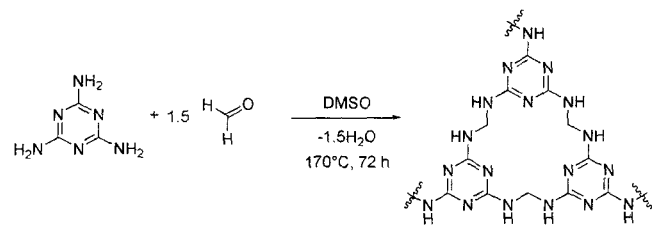
FIG. 10 shows a reaction scheme for synthesis of a monomer ring comprising a melamine-formaldehyde copolymer.

There is shown in FIG. 10, a reaction scheme for the formation of a two dimensional melamine-formaldehyde ring monomer unit. In a well controlled reaction, the synthesis of the melamine-formaldehyde will result in tessellation of the ring monomer unit. However, in a practical situation, perfect control of reaction conditions would not be possible. Hence, formation of the tessellated ring monomer unit will be interposed with periods of amorphous irregular geometry in the formation of melamine-formaldehyde nanoparticles.

The reaction mixture was heated gradually to give a colorless solution. Further heating at 180° C. for 72 hrs resulted in the formation of a white solid. The solid was filtered, and washed with water (3×) and acetone (2×). The resulting solid was dried under vacuum at 80° C. for 24 h.

Using the above protocol, 8 samples of mesoporous PMF (Examples 1a to 1h) were prepared. The molar ratios of reactants, amount of solvent, reaction time and temperature for Examples 1a to 1h are provided in Table 1 below. The resulting samples were analyzed by nitrogen sorption at 77 K; surface area and pore diameter were obtained by the Brunauer-Emmet-Teller (BET) and Barrett-Joyner-Halenda (BJH) methods, respectively. Carbon dioxide sorption isotherm was analyzed at 273 K, and the results are also shown in Table 1 below.

TABLE 1

| | Reaction Conditions | | | | $N_2$ Adsorption at 77K using BET and BJH methods | | | | $CO_2$ |
| --- | --- | --- | --- | --- | --- | --- | --- | --- | --- |
| Sample | Total Conc of reactants. (M) | PMF to Melamine (Molar Ratio) | T. (° C.) | Reaction Time (h) | Surface Area ($m^2/g$) | Pore Diameter (nm) | TPV ($cm^3/g$) | Micropore Volume ($cm^3/g$) | Adsorption Capacity (wt %) |
| 1-a | 2.0 | 3.75 | 180 | 72 | 743 | 10.4 | 1.06 | 0.14 | 14.0 |
| 1-b | 2.0 | 4.50 | 180 | 72 | 713 | 8.9 | 1.00 | 0.10 | 11.4 |
| 1-c | 1.5 | 3.75 | 180 | 72 | 898 | 11.1 | 1.48 | 0.14 | 14.3 |
| 1-d | 2.5 | 3.75 | 180 | 72 | 739 | 10.0 | 0.89 | 0.16 | 14.1 |
| 1-e | 2.0 | 3.75 | 180 | 48 | 852 | 10.7 | 1.30 | 0.16 | 14.9 |
| 1-f | 2.0 | 3.75 | 180 | 120 | 684 | 9.2 | 0.66 | 0.17 | 14.1 |
| 1-g | 2.0 | 3.75 | 160 | 72 | 636 | 13.3 | 1.41 | 0.09 | 12.0 |
| 1-h | 2.0 | 2.25 | 180 | 72 | 72.9 | 19.2 | 0.06 | 0.02 | 7.8 |

EXAMPLES

Non-limiting examples of the invention will be further described in greater detail by reference to specific Examples, which should not be construed as in any way limiting the scope of the invention.

The solvents used in the following examples, DMSO, tetrahydrofuran (THF), Dichloromethane ($CH_2Cl_2$) and acetone were purchased from Tee Hai Chemicals, Singapore. Melamine and paraformaldehyde were purchased from Sigma-Aldrich, United States of America.

Example 1

Mesoporous Melamine-Formaldehyde Co-polymers Synthesized on a Hot Plate

Melamine and paraformaldehyde were added to a 20-ml glass vial, followed by the addition of anhydrous DMSO.

Example 2

Mesoporous Melamine-Formaldehyde Co-polymers Synthesized in an Oven

Melamine and paraformaldehyde were added to a 10 ml Teflon container with a magnetic stirrer, followed by addition of anhydrous DMSO. The Teflon container was capped and secured within a steel bomb reactor, which was heated to 120° C. in an oven (Memmert Universal UNE 400) for 1 hr. The bomb reactor was removed from the oven for stirring on a magnetic plate for 30 minutes to obtain a homogeneous solution. The bomb reactor was then heated again in the oven at 170° C. for 72 hours. The reactor was allowed to cool to room temperature, and the solid product obtained was crushed, filtered, and washed with DMSO, acetone (3×), THF (3×) and $CH_2Cl_2$. The resulting white solid was dried under vacuum at 80° C. for 24 hr.

12 different samples (Examples 2a to 2l) were produced based on the above described protocol. The molar ratios of reactants, solvent volume are provided in Table below. The samples were analyzed according to the analytical methods mentioned in Example 1, and the results are also shown in Table 2 below.

TABLE 2

| | Reaction Conditions | | BET | BJH | Total | | $CO_2$ |
| | | | \multicolumn{4}{c}{$N_2$ Adsorption at 77K} | |
| Sample | Conc (M) | PMF to Melamine (Molar Ratio) | Surface Area ($m^2/g$) | Pore Diameter (nm) | Pore Volume ($cm^3/g$) | Micropore Volume ($cm^3/g$) | Adsorption Capacity (wt %) |
|---|---|---|---|---|---|---|---|
| 2-a | 1.5 | 2.25 | 1099 | 10.3 | 2.09 | 0.13 | 15.3 |
| 2-b | 1.5 | 3.00 | 1004 | 8.3 | 1.78 | 0.06 | 11.4 |
| 2-c | 2.0 | 2.25 | 1017 | 12.4 | 2.21 | 0.13 | 14.5 |
| 2-d | 2.0 | 3.00 | 971 | 10.2 | 2.08 | 0.06 | 11.0 |
| 2-e | 2.0 | 3.75 | 915 | 5.9 | 1.14 | 0.06 | 11.2 |
| 2-f | 2.5 | 2.25 | 1074 | 17.5 | 3.29 | 0.14 | 15.7 |
| 2-g | 2.5 | 3.00 | 1046 | 16.5 | 3.46 | 0.08 | 12.6 |
| 2-h | 2.0 | 1.80 | 791 | 11.7 | 1.35 | 0.15 | 13.9 |
| 2-i | 2.5 | 1.80 | 930 | 15.7 | 1.90 | 0.21 | 18.7 |
| 2-j | 2.75 | 1.80 | 903 | 23.0 | 2.79 | 0.20 | 17.7 |
| 2-k | 2.5 | 1.65 | 785 | 13.8 | 1.21 | 0.20 | 17.7 |
| 2-l | 2.5 | 1.95 | 905 | 15.9 | 2.22 | 0.16 | 15.5 |

Example 3

Mesoporous Melamine-Formaldehyde Co-polymers Synthesized Using a Solvent Admixture of DMSO and $H_2O$ Paraformaldehyde and melamine were mixed in a molar ratio of 3:1 and reacted in the presence of a solvent admixture comprising DMSO and $H_2O$. The total concentration of the reactants was 2.0 M and the overall reaction was performed in a bomb reactor that was heated in an oven for 72 hrs.

7 samples (Examples 3a-3g) of mesoporous PMF were produced using the above described protocol. The volume ratio of DMSO to $H_2O$, oven temperatures were varied according to Table 3. The product samples were analyzed according to the analytical methods mentioned in example 1, with the results also shown in Table 3 below.

TABLE 3

| | Reaction Conditions | | BET | BJH | Total | | $CO_2$ |
| | | | \multicolumn{4}{c}{$N_2$ Adsorption at 77K} | |
| Sample | DMSO/$H_2O$ Volume Ratio | Temp. (° C.) | Surface Area ($m^2/g$) | Pore Diameter (nm) | Pore Volume ($cm^3/g$) | Micropore Volume ($cm^3/g$) | Adsorption Capacity$^c$ (wt %) |
|---|---|---|---|---|---|---|---|
| 3-a | 1:3 | 140 | 11.9 | 67.9 | 0.14 | 0.002 | 7.3 |
| 3-b | 1:1 | 140 | 581 | 10.0 | 0.46 | 0.18 | 15.9 |
| 3-c | 3:1 | 140 | 996 | 7.1 | 1.36 | 0.12 | 14.9 |
| 3-d | 1:1 | 140 | 581 | 10.0 | 0.46 | 0.18 | 15.9 |
| 3-e | 3:1 | 140 | 996 | 7.1 | 1.36 | 0.12 | 14.9 |
| 3-f | 1:1 | 100 | 168.1 | 12.1 | 0.46 | 0.007 | 4.3 |
| 3-g | 1:1 | 120 | 235.7 | 13.1 | 0.55 | 0.03 | 8.6 |

Comparative Example 4

Mesoporous PMF Synthesized with N-Methylpyrrolidone (NMP) as Solvent

Paraformaldehyde and melamine were mixed in a molar ratio of 3.75 to 1 and reacted in the presence of NMP. The overall concentration of reactants was 2.0 M and the reaction mixture was heated at a temperature of 180° C. for hrs. The resulting sample was analyzed according to the analytical methods in example 1, and the results are provided below.

Surface Area ($m^2/g$)=4.6
Pore size (nm)=57.5
Total Pore Volume ($cm^3/g$)=0.005
Micropore Volume ($cm^3/g$)=0.003
$CO_2$ adsorption (wt %)=4.7

This comparative Example demonstrates that DMSO is likely to play an important role in the formation of micropores, which strong correlates with the carbon dioxide gas adsorption capacity of the resulting mesoporous PMF. In this Example, it can be seen that both the micropore volume and surface area obtained are significantly inferior to the PMFs obtained in Examples 1-3, which accordingly translated to an adsorption capacity of less than 5 wt %.

Example 5

TGA Gas Cycling Experiments

Melamine-formaldehyde co-polymer from Example 2i was subjected to the following gas cyclic treatment at 25° C.: carbon dioxide (99.8%) gas flow (20 ml/min) for 30 min, followed by nitrogen (99.9995%) gas flow (20 ml/min) for 45 min.

Changes in weight of the PMF sample were recorded by the TGA instrument. Prior to the cyclic treatment, the sample was first purged at 120° C. for 60 minutes under nitrogen gas flow, followed by cooling to room temperature. Change in buoyancy effects arising from the switching of gases was recorded using an empty sample pan, and the buoyancy effects were corrected for in the TGA curve.

The results may be described with reference to FIG. 3(b). There was an evident sudden sharp increase in weight % of the synthesized melamine-formaldehyde co-polymer which continued until a maximum adsorption at 9.3 weight % was achieved. Once the gas feed was switched to nitrogen gas, a similarly rapid weight % loss was observed, due to the desorption of the carbon dioxide from the PMF. The adsorption and desorption cycle was continued for 6 successive cycles and, no loss in either the speed or capacity of adsorption/desorption was observed. This Example clearly demonstrates the suitability of the PMF for use in large scale industrial gas scrubbing applications, due to its efficient gas uptake and discharge during regeneration, and its durability for multiple-use without exhibiting any loss in adsorption capacity.

Example 6

Through-Flow Column Adsorption

Figure 3:
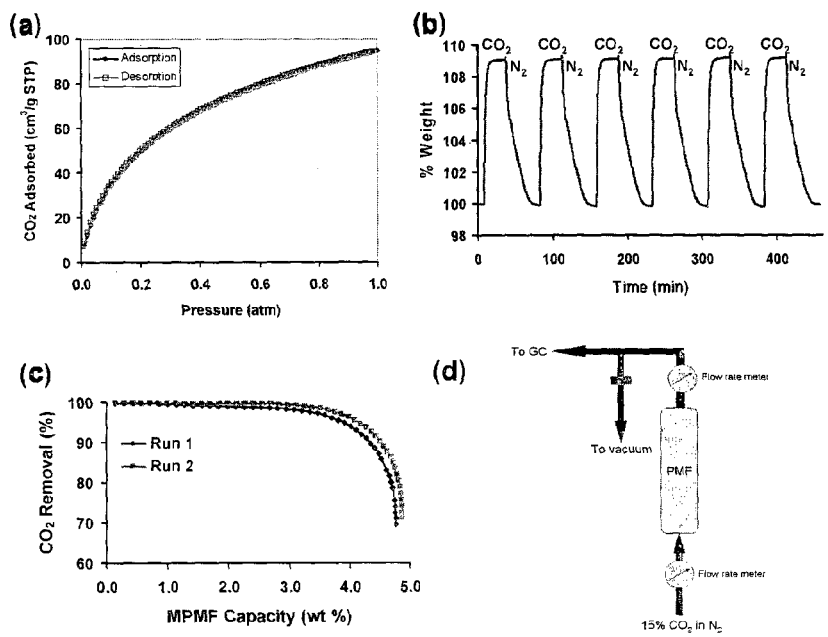
FIG. 3(a) shows carbon dioxide gas adsorption/desorption isotherms at 273 K using the melamine-formaldehyde co-polymer of Example 2k.
FIG. 3(b) shows the gas cycling experiment using the melamine-formaldehyde co-polymer of Example 2i, under gas flow of carbon dioxide, followed by nitrogen.
FIG. 3(c) shows the dynamic performance of the melamine-formaldehyde co-polymer of Example 2i used for carbon dioxide capture and carbon dioxide removal.
FIG. 3(d) shows the schematic diagram for the through-flow experiment.

A schematic diagram for the experimental set-up is provided in FIG. 3(d). A steel column of 10 cm in length and 10 mm internal diameter was packed with 1.036 g of melamine-formaldehyde co-polymer powder from Example 2i. The packed column was subsequently connected to a cylinder of 15% carbon dioxide gas in nitrogen gas. Gas flow was controlled with a cylinder regulator and a gas flow meter at a flow rate of 2.5 ml/min. The output gas from the packed column was connected directly to a Gas Chromatograph for analysis. The Gas Chromatograph instrument was conditioned for 1 h at 200° C. prior to the analysis. An optimized Gas Chromatograph method of isothermal analysis at 75° C. for 1.8 min was employed. Retention time for nitrogen gas peak and carbon dioxide gas peak were at 0.68 min and 1.48 min respectively. The time interval between consecutive Gas Chromatograph analyses was 2.15 min. The peak areas were calculated to obtain % carbon dioxide, with 15% carbon dioxide gas in Nitrogen gas as a reference gas mixture. Vacuum was applied to the experimental setup before analysis and the gas lines were purged with inert helium gas prior to carbon dioxide gas adsorption by synthesized melamine-formaldehyde co-polymer. For recycling of the synthesized melamine-formaldehyde co-polymer, vacuum (pressure of about 1 mbar) was applied to the column for 1 h and the adsorption analysis repeated as stated above.

Figure 9:
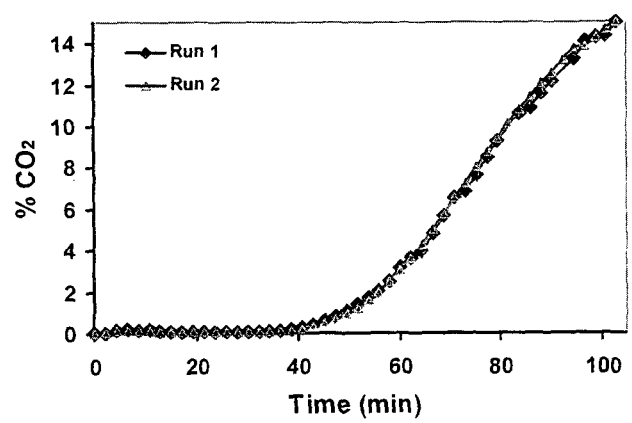
FIG. 9 shows the breakthrough curve for carbon dioxide gas adsorption by the synthesized melamine-formaldehyde co-polymer of Example 2i.

The use of an analyte gas at 15% carbon dioxide gas in nitrogen gas simulates the actual composition of flue gas discharged by power plants. FIG. 9 shows that almost all the carbon dioxide gas in the gas feed was adsorbed by the synthesized melamine-formaldehyde co-polymer in the first 40 minutes until the synthesized melamine-formaldehyde co-polymer was approaching saturation. With reference to FIG. 3(c), the carbon dioxide adsorption capacity of the synthesized melamine-formaldehyde co-polymer reached 3.8, 4.2 and 4.7 wt % for 99%, 95% and 90% removal of $CO_2$ from the analyte gas respectively. This performance is comparable to an optimized dynamic capacity of a 30% MEA solution.

Vacuum was used to regenerate the packed column and full carbon dioxide adsorption capacity was recovered. This again exemplifies the ease of regeneration and indicates the suitability of the presently disclosed melamine-formaldehyde co-polymer as a more cost-effective and energy efficient alternative to current liquid and/or solid gas sorbents used in the industry.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

APPLICATIONS

The disclosed mesoporous PMF can be envisioned as a cost-effective and viable alternative to current liquid carbon dioxide gas scrubbers, such as MEA. In particular, the disclosed solid PMF sorbent is inexpensive to produce and in contrast to MEA, the disclosed PMF sorbent can be easily regenerated due to the weakly binding intermolecular forces between PMF and $CO_2$, thereby negating or at least minimizes the energy penalties so commonly associated with MEA. Further in contrast to MEA, the disclosed PMF sorbent does not require periodic replenishment and therefore entails additional cost savings.

The disclosed mesoporous PMF is also superior to currently known solid gas sorbents, not least due to its high BET surface area and micropore volume, which allows the disclosed mesoporous PMF to exhibit up a $CO_2$ adsorption capacity of up to about 20 wt %. Even more advantageously, the disclosed mesoporous PMF does not require complex synthesis procedures. In particular, the disclosed PMF may be produced in a one-step solvothermal reaction process, without requiring the use of basic catalysts and/or other pH modifying processing steps. In contrast to existing methods of producing PMF for gas sorption, which may be cumbersome and potentially expensive, the straightforward synthesis method disclosed in the present invention lends itself industrial scale-up potential and ease of implementation.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A polymer material comprising mesopores disposed between melamine-formaldehyde co-polymer nano-particles and wherein micropores extend within the co-polymer nano-particles, wherein the melamine-formaldehyde co-polymer is composed of repeating units of a monomer having a ring structure, wherein each monomer ring structure comprises at least three melamine groups.

2. The polymer material as claimed in claim 1, wherein the polymer material has a surface area of at least 300 $m^2/g$.

3. The polymer material of claim 1, wherein, in each monomer ring structure, an alkyl bridge extends between a pair of melamine groups.

4. The polymer material as claimed in claim 1, wherein the size of said mesopores is in the range of 5 nm to 50 nm.

5. A sorbent material for adsorbing gas comprising the polymer material as claimed in claim 1.

6. A sorbent material for adsorbing gas comprising an agglomeration of melamine-formaldehyde co-polymer nano-particles with mesopores extending between said nano-particles and wherein micropores extend within the nano-particles.

7. The sorbent material as claimed in claim 6, wherein the sorbent material exhibits the ability to adsorb carbon dioxide gas.

8. The sorbent material as claimed in claim 7, wherein the adsorption capacity of carbon dioxide gas is at least 10 wt % based on the total weight of the sorbent material, measured at 1 atm, 0° C.

9. Use of the polymer material as claimed in claim 1 to adsorb a gas.

10. The use as claimed in claim 9, wherein the gas is carbon dioxide or carbon monoxide.

11. A method of removing at least one of carbon dioxide gas and carbon monoxide gas from a gas stream containing said at least one of carbon dioxide gas and carbon monoxide gas, the method comprising the step of contacting the gas stream with a polymer material as claimed in claim 1 to adsorb at least one of said carbon dioxide gas and carbon monoxide gas thereon.

12. The polymer material of claim 3, wherein the alkyl bridge is a methyl.

13. The polymer material of claim 1, wherein three melamine groups are provided in each monomer ring structure.

14. The polymer material of claim 1, wherein the total pore volume of the mesopores and the micropores is in the range of 0.7 cm$^3$/g to 3.5 cm$^3$/g.

15. The polymer material of claim 1, wherein the total pore volume of the micropores is in the range of 0.06 cm$^3$/g to 0.21 cm$^3$/g.

16. The polymer material of claim 1, wherein the monomer ring structure is of the following structure:

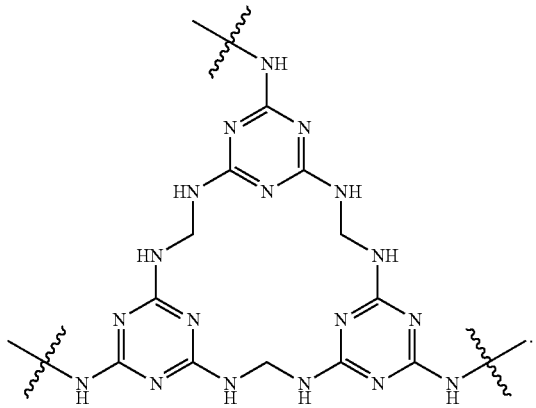 [SMILES: *Nc1nc2nc(n1)NCNc1nc(N*)nc(n1)NCNc1nc(N*)nc(n1)NCN2]

* * * * *